(12) United States Patent
Heinemann

(10) Patent No.: US 6,427,099 B1
(45) Date of Patent: Jul. 30, 2002

(54) METHOD AND SYSTEM FOR DATA RETRIEVAL

(75) Inventor: Gerhard Heinemann, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/023,074

(22) Filed: Dec. 18, 2001

(30) Foreign Application Priority Data

Sep. 28, 2001 (DE) .......................................... 101 48 160

(51) Int. Cl.$^7$ ............................................... G06F 19/00
(52) U.S. Cl. ....................... 700/245; 700/174; 700/175; 700/184; 700/218; 700/243; 343/143; 343/373; 701/23; 242/338.4; 242/335
(58) Field of Search ................................. 700/245, 218, 700/184, 174, 175, 243, 247; 348/143, 373, 48; 701/23; 414/277, 281; 242/338.4, 335

(56) References Cited

U.S. PATENT DOCUMENTS 6,320,610 B1 * 9/1976 Isohata ........................ 198/380
4,864,511 A * 9/1989 Moy et al. ................... 198/394
4,928,245 A * 5/1990 Moy et al. ................... 198/394
4,932,826 A * 6/1990 Moy et al. ................... 198/380

OTHER PUBLICATIONS

Mizoguchi et al., Robotic office room to support office work by human behavior understanding function with networked machines, 1996, IEEE, pp. 237–244.*

Cretual et al., Image–based visual servoing by integration of dynamic measurements, 1998, IEEE, pp. 1994–2001.*

* cited by examiner

Primary Examiner—William A. Cuchlinski, Jr.
Assistant Examiner—McDieunel Marc

(57) ABSTRACT

A method for retrieving data (D, B, I) from machine tools, production equipment, or robots with at least one motion controller or drive controller (R). Image and/or video and/or audio data (B) relating to the mechanical movement in normal operation are displayed or processed in real-time, synchronized with the data available (I) in the motion controller or the drive controller (R). Furthermore, it is possible for the user to select data (D, B, I), compress them prior to transfer (DK1, DK2), use a web server (W) for transfer purposes, and save synchronized data (D, B, I).

9 Claims, 2 Drawing Sheets

METHOD AND SYSTEM FOR DATA RETRIEVAL

FIELD OF THE INVENTION

The invention relates to a method and a system for data retrieval from machine tools, production equipment, or robots with at least one motion controller or drive controller.

RELATED INFORMATION

Additional monitoring of machine tools, production equipment or robots by means of image or sound recording devices is well known in the art. For example, recording and storing image and audio data from production equipment together with the current time information are known from the abstract of the Japanese patent application JP 2001 125612 A. In an additional later step, these data are synchronized by means of their current time information. For this purpose, considerable storage capacities are necessary to ensure that later viewing or listening is possible.

OBJECTS & SUMMARY OF THE INVENTION

The aim of the invention is to improve retrieval of various types of data from machine tools, production equipment, or robots with at least one motion controller or drive controller.

According to the invention, this aim is achieved by the fact that the image and/or video and/or audio data related to the mechanical movement in normal operation, synchronized in real-time with the data available in the motion controller or the drive controller, are displayed or processed synchronized in real-time. Thus real-time synchronized data can be made immediately available to a user.

A first advantageous method of the invention is characterized by the fact that the data to be synchronized are selected by a user. Thus it is not necessary to always synchronize all the available data, but the data flow can be advantageously selected before or during operation of the indicated machines. Consequently, the user can also freely decide which data he would like to synchronize.

A further advantageous method of the invention is characterized by the fact that the image and/or video and/or audio data is compressed before transfer. Thus the data transfer flow is advantageously reduced.

A further advantageous method of the invention is characterized by the fact that several synchronized data blocks are stored for later use in a motion controller or driver controller memory after synchronized display or processing. Consequently, a user or a device for further processing may also view or process past events.

A further advantageous method of the invention is characterized by the fact that the synchronized data is retrieved from at least one web server. Thus all Internet-related technologies can be used advantageously.

A further advantageous method of the invention is characterized by the fact that several synchronized data blocks are stored for later use on at least one web server. Thus, a user is able to access synchronized data blocks for past events.

A further advantageous method of the invention is characterized by the fact that additional data are recorded in the motion controller or drive controller and are synchronized with the image and/or video and/or audio data or the internal data. Thus a user can record and synchronize additional data not available in the motion controller or the drive controller. These data can include, for example, measurement data recorded by means of an oscillograph.

A further advantageous method of the invention is characterized by the fact that synchronization of data is started and stopped by means of an identification signal. Consequently, intermittent data are synchronized, but only when a particular identification signal appears. The identification signal, for example, can be the output of a comparator circuit that compares the measured values with particular upper and lower limits.

A first advantageous embodiment of the invention is characterized by the fact that the image and/or video and/or audio data related to the mechanical motion in normal operation, synchronized with the data available in the motion controller or the drive controller, can be displayed or processed. So a user can advantageously use a system that provides him the indicated data synchronized in real-time.

A further advantageous embodiment of the invention is characterized by the fact that a method according to one of Claims 2 to 8 can be implemented in the system. So a user can advantageously use all the aforementioned methods in the system.

BRIEF DESCRIPTION OF THE DRAWINGS

An illustrative example of the invention is depicted in the drawing and is explained in more detail in the following. Shown are.

DETAILED DESCRIPTION OF THE PREFERRED EMBODIMENTS

Figure 1:
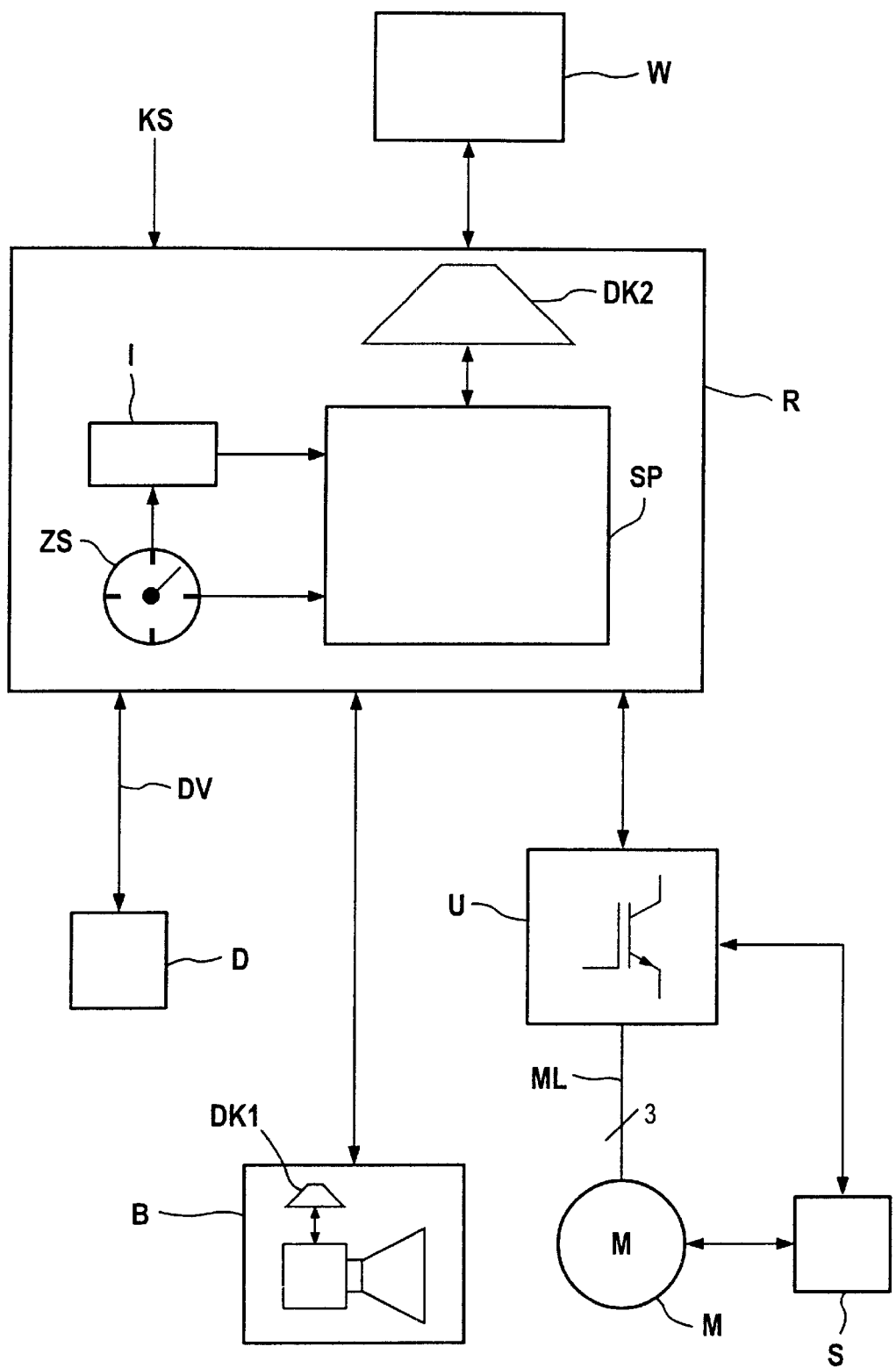
FIG. 1 a symbolic layout of a machine tool, production equipment, or robot with the capability of data synchronization.

In the embodiment according to FIG. 1, the capability of data synchronization is shown in a symbolic layout of a machine tool, production equipment, or robot. A motor M, which can be rotary or linear in design, is supplied with the required electrical power through a motor lead ML from an inverter U. The inverter U is identified by a power electronics circuit symbol in a square block. Only one connection of the motor lead ML is drawn in the figure, with a label indicating that it is a three-phase motor lead.

All additional connections are marked by arrow or double-arrow connections in the embodiment. Only one double-arrow connection is indicated in the embodiment for the data links DV.

The motor is connected with a sensor S that registers, for example, the motor temperature and transfers this to the inverter U. This, as well as further data D, are transferred from inverter U via a data link DV to controller R. But it is also possible for sensor S to be directly connected to controller R. The data links DV can, for example, consist of an ethernet bus system that enables a high data transfer rate. Here "fast ethernet" should also be specified, which provides high data transfer rates. It is only when using data links DV with high data transfer rates that the user is able to use data-intensive applications. For example, simultaneous image, video, and audio data transfer is then possible with the invention. Especially when faults occur or when monitoring technical facilities, the invention provides the user with a convenient aid in which the data are synchronized with each other.

An image recorder is installed on the machine tool, production equipment, or robot that transfers image data B of motor M to controller R. The image data B are symbolized in the embodiment by a camera symbol in a rectangular block diagram. Additionally drawn in the block diagram is optional data compression DK1, which can be provided by hardware or software means. The data compression DK1, DK2 is represented by a trapezoid, which symbolizes data compression by means of its parallel sides of different lengths. Thus it is possible to compress single images (frames) or image sequences, and accomplish a transfer with a smaller data volume.

The image data B are linked to internal quantities I. This function can, for example, be performed by a time stamp ZS, which in the embodiment is drawn as a clock symbol. The time stamp function ZS ensures that the internal quantities I as well as further data D, B are temporally synchronous and fix the exact registration time point.

Instead of the image data B, video or audio data or all the data D can also be linked simultaneously with each other. It is also conceivable that additional data D, synchronized with the internal quantities I, are displayed or are processed synchronized in real time. A user can, for example, record measurement values with the help of an oscilloscope and link these data D with internal quantities I in the controller R, and elsewhere display them or process them further in real time.

For optimal utilization of resources, data compression DK2 for further processing or transferring of the resulting data D, B, I is provided for in controller R.

In the embodiment, the data D, B, I are transferred to a web server W. For clarity, peripheral output devices are not shown here. For example, standard PCs, server and observation devices, as well as further optional visualization or storage devices (e.g., printer, storage media) may be considered.

To display the data D, B, I, it is not absolutely necessary to transfer the data to a web server. These data can also be displayed directly on the machine or the control device R from display devices.

By means of the high transfer capability provided by the data link, a controller R can utilize these and provide synchronous data D, B, I to a user. For example, this can carry out remote diagnostics, documentation of the facility or the condition of the facility, or remote control. The system can also be linked to "Electronic Production Services", in which a user can use a central knowledge base or a central service (e.g., software support, data storage) for his facility.

Until now, within drive and control devices as well as additional measuring, maintenance, and monitoring devices, only internal quantities I such as positions, rotational speeds, and currents could be registered, analyzed, and displayed. Image and sound information, e.g., about a corresponding machine condition, could not be recorded synchronously. On machines or control systems, existing cameras have until now had no functional or temporal connection with real-time open-loop or closed-loop control systems.

By employing universal fast and isochronous interfaces to connect peripheral devices to machine tools, production equipment, and robots, image sensors (digital photographic cameras and video cameras) among others can also supply, synchronously with the control clock, digital image data to the open-loop or closed-loop control system [of] these devices. Synchronous linking of different data and forwarding to an overlying automation level considerably expands the possibilities for utilization and diagnostics of these machines. Machine conditions can be visually represented as temporally correlated with internal quantities I, or other data D. Synchronous data means that a user has more analysis options available.

In the embodiment according to FIG. 1, an identification signal KS is additionally shown, via which certain actions can be started or stopped. The identification signal KS can be generated externally as well as internally within the control system R. So it is possible, for example, to start synchronous data transfer to a web server if the measurement data or internal quantities I exceed or fall below certain values.

Figure 2:
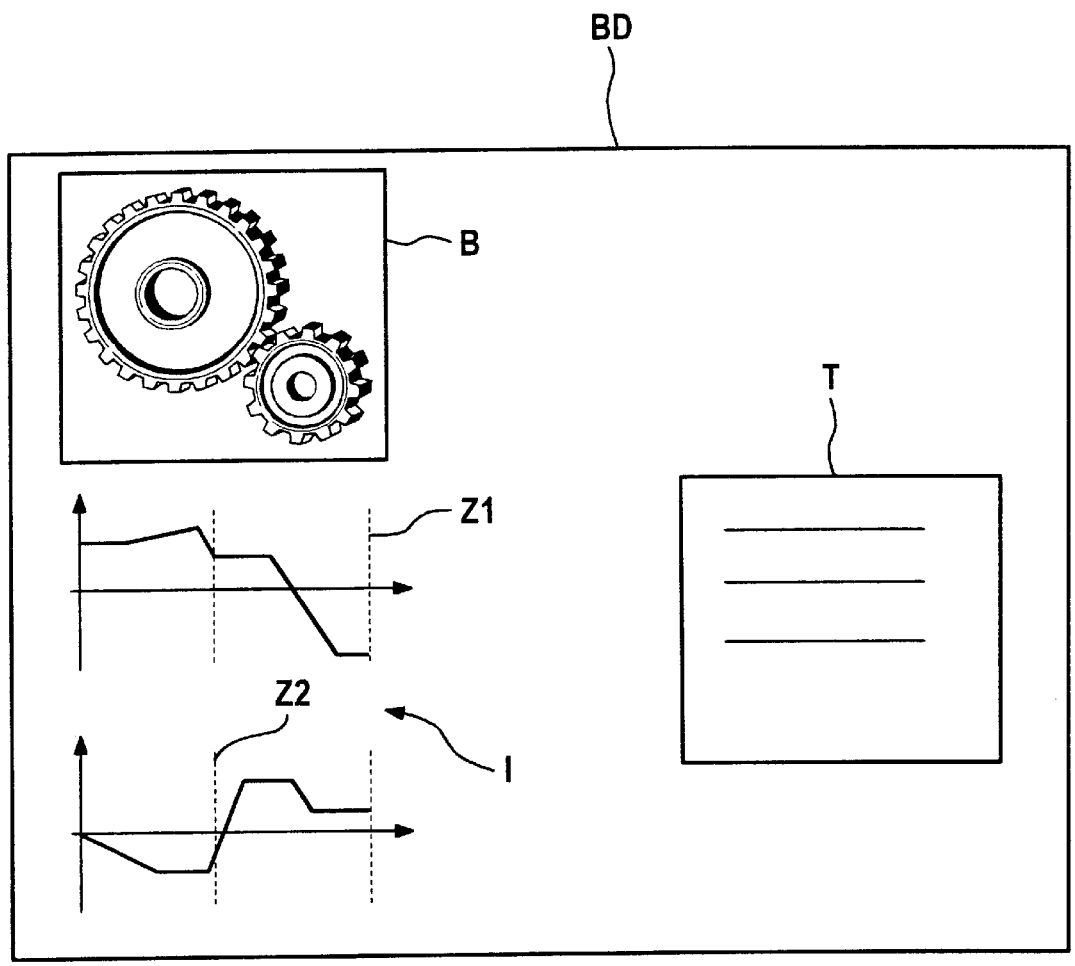
FIG. 2 a symbolic layout of a display for viewing synchronized data.

In the embodiment according to FIG. 2, a schematic layout is shown of an onscreen display BD for viewing synchronized data D, B, I. A user can then view the image data B synchronized with the internal quantities I. The curve for two internal quantities I is plotted on the on-screen display BD. The data D, B, I that are synchronized with the respective on-screen display B can be identified at the plotted time point Z1. The respective time points Z1 and Z2 in the embodiment are marked by a dashed vertical line drawn above the internal data I.

When downtime occurs, for example, it is conceivable that a user can access previous data blocks consisting of data that are synchronized with each other, and can look through them step by step.

If a user moves the last displayed time point Z1, Z2 to any selectable time point Z1, Z2 that lies within the time interval of the stored data blocks, then he can scroll through a sequence of synchronized data blocks. By means of the invention, the user can advantageously try to ascertain the definitive cause for the downtime.

Additions can be represented on the onscreen display by additional symbols or numeric characters that are connected with the facility or the image data B or the internal quantities I. In addition, on the onscreen display BD a rectangle is drawn with three horizontal lines, one below the other, which symbolizes display of text data T.

I claim:

1. A method for retrieval of data from machine tools, production equipment or robots with at least one motion controller or drive controller, the method comprising the steps of displaying an image and/or video and/or audio data (B) related to a mechanical movement in a normal operation in real-time (BD) or processed synchronized in real-time with data available (I) in the motion controller or the drive controller (R); and synchronizing the display of the data related to the mechanical movement with the data in the motion controller.

2. The method according to claim 1, wherein the data to be synchronized (D, B, I) can be selected by a user.

3. The method according to claim 1, wherein the image and/or video and/or audio data (B) is compressed prior to the transfer (DK1, DK2).

4. The method according to claim 1, wherein several synchronized data blocks (D, B, I) is temporarily in a memory (SP) of the motion controller or the drive controller (R) following synchronized display or processing.

5. The method according to claim 1, wherein the synchronized data (D, B, I) is stored for later use on at least one web server (W).

6. The method according to claim 5, wherein several synchronized data blocks are temporarily stored on at least one web server (W).

7. The method according to claim 1, wherein additional data (D) are recorded in the motion controller or drive controller (R) and are synchronized with the image and/or video and/or audio data (B) or an internal data (I).

8. The method according to claim 1, wherein an identification signal (KS) will start or stop the synchronization of data (D, B, I).

9. A system for retrieving data from machine tools, production equipment, or robots with at least one motion controller or drive controller via a transfer, processing or synchronization of data, comprising: image and/or video and/or audio data (B) related to the mechanical movement in a normal operation is displayed or processed, synchronized with the data available in motion controller or drive controller (I).

* * * * *